April 27, 1954   O. C. KINDORF   2,676,680
BEAM STRUCTURE AND ASSOCIATED SECURING MEANS
Filed Feb. 5, 1952

INVENTOR.
ORLAN C. KINDORF
BY
Charles M. Fryer
ATTORNEY

Patented Apr. 27, 1954

2,676,680

UNITED STATES PATENT OFFICE 2,676,680

BEAM STRUCTURE AND ASSOCIATED SECURING MEANS

Orlan C. Kindorf, Oakland, Calif.

Application February 5, 1952, Serial No. 269,994

2 Claims. (Cl. 189—35)

1

The present invention relates to a beam structure and to means for securely fastening a threaded rod thereto for the purpose of supporting hangers or brackets which in turn support pipes, fixtures or auxiliary building structure.

It is common practice to provide a beam either as a structural part or auxiliary to a building frame which is capable of receiving bolts or threaded parts throughout its length to facilitate the installation of pipes, conduits, electrical fixtures and other devices required in the building. Since supports for such devices are required in very large quantities, it is desirable that they be made as simple and inexpensively as possible without sacrificing the strength and security necessary to their function.

It is the object of this invention to provide an improved beam of the kind described and an associated securing means therefor of extremely simple and inexpensive construction.

Further and more specific objects of the invention and the manner in which the invention is carried into practice are made apparent in the following specification by reference to the accompanying drawings.

Figure 1:
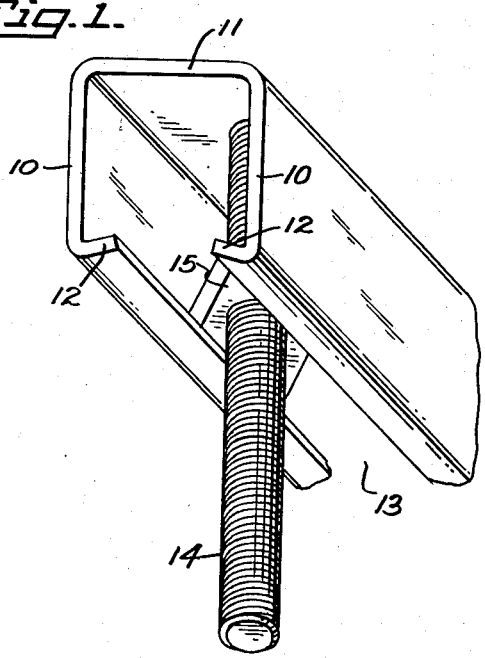
Fig. 1 is a perspective view of a short length of beam embodying the present invention showing the securing means of the invention in place therein.
Figure 2:
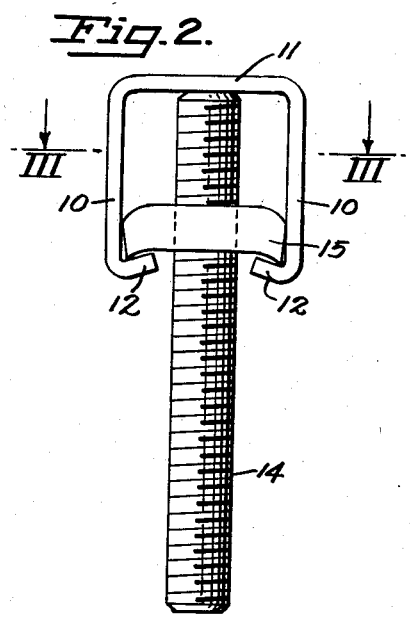
Fig. 2 is a view in end elevation of the structure illustrated in Fig. 1.

The beam of the present invention is best illustrated in Figs. 1 and 2 as having a pair of side walls 10 connected by a web or back wall 11. Flanges 12 are bent from the edges of the side walls and terminate short of each other to leave a central space or slot 13 throughout the length of the beam so that the beam is of generally rectangular tubular shape with a longitudinal slot extending throughout the length of one wall. The flanges 12 are bent beyond a right angle to form acute angles with the inner surfaces of the side walls 10 for reasons that will presently appear.

A threaded rod or screw is shown at 14 and may be in the form shown or may be an eye

Figure 4:
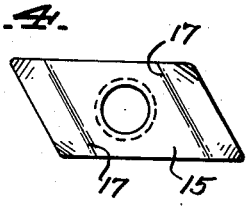
Fig. 4 is a plan view of a nut member which forms a part of the assembly shown in Figs. 1, 2 and 3.

2 bolt, hook bolt or any other similar device designed for supporting some fixture or the like with respect to the beam. One of the principle objects of the invention is to provide means for supporting any number of such screws 14 with relation to the beam so that they will be rigidly held in place and serve in turn as supports for any required fixtures or equipment. The screw 14 is held in place partially by a nut 15 shown in detail Figs. 4, 5 and 6 and it is through the construction of this nut and the manner in which it cooperates with the particular configuration of the beam that an unusually secure, though inexpensive fastening means is obtained.

Figure 3:
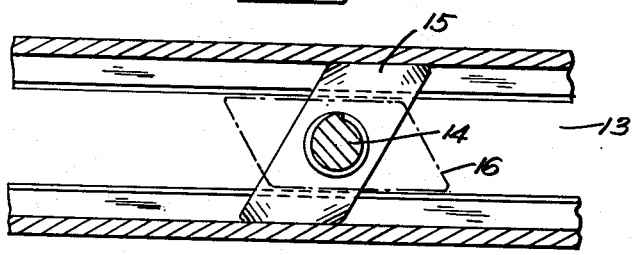
Fig. 3 is a sectional view taken on the line III—III of Fig. 2.

The blank of the nut 15 is shaped as an elongated parallelogram having a narrow dimension slightly less than the width of the slot 13 so that it may be readily inserted into the beam at any point throughout its length; the position of the nut as it is being inserted being shown in broken lines at 16 in Fig. 3. The greater dimension of the nut is such as to span the space between the side walls 10 of the beam with the ends of the nut in parallelism therewith as best shown in Fig. 3 and to be supported within the beam by contact with the inner surfaces of the flanges 12. With the nut in this position, rotation of the screw 14 which is threaded through the nut will advance the screw into engagement with the inner surface of the back wall 11 of the beam to hold the nut against turning or slipping movement on the flanges 12.

Since structures supported by the screw 14 may be subject to shock or by vibration from various causes, it is desirable to provide further insurance against slipping or turning of the nut and this is accomplished by the particular construction of the beam and nut as herein illustrated. As previously mentioned, the flanges 12 which define the slot in the beam are bent inwardly or at an acute angle with respect to the side walls 10. This provides a depression within the beam between each flange and its associated side wall. The nut blank instead of being in the conventional flat form is bent downwardly adjacent its ends which engage the inner side walls 10 of the beam, the bends occurring at approximately the spacing of the width of the slot 13 or along the lines indicated at 17 in Fig. 4. This gives the nut an arched shape with downwardly inclined ends fitting substantially within the depressions formed by the flanges 12. Consequently when the screw 14 is tightened to the position shown in Fig. 2, the tendency of the nut is to remain in its proper position shown in Fig. 3 rather than to twist toward the broken line position 16 where it might become separated from the channel.

Figure 6:
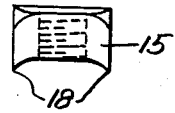
Fig. 6 is a view in end elevation of the same.
Figure 5:
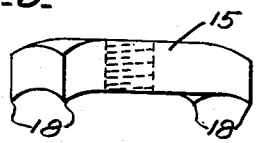
Fig. 5 is a view in side elevation of the same nut member.

It is also desirable to prevent sliding movement of the nut lengthwise of the channel and this is accomplished by bending or swedging each of the four corners of the nut downwardly to provide points or prongs best shown at 18 in Figs. 5 and 6 which pierce or bite into the surface of the metal of which the beam is formed and thus deter slipping of the nut longitudinally of the channel particularly when the screw 14 has been tightened.

I am aware that slotted channels bearing a general resemblance to the one disclosed in Figs. 1 and 2 have previously been employed and that nuts have been used for reception by such channels together with means to prevent sliding and twisting. However the invention herein disclosed distinguishes from similar devices previously used particularly in its simplicity and low cost of manufacture. The channel is itself inexpensive to manufacture because it does not include reentering parts which require complex dies for their formation and the nut consists of a simple stamping which may in a single punch press operation be provided with the arch-like shape and prongs which function in the manner hereinbefore described.

Another advantage of the structure disclosed is that the arched nut and inturned flanges 12 cause weight supported by the flanges to be imposed adjacent the walls 10, thus minimizing the tendency of the flanges 12 to bend or break at their juncture with the walls. This increases the load bearing capacity of the beam.

I claim:

1. A beam structure and securing means comprising a beam with a back and two side walls forming a channel, a flange on the edge of each side wall extending toward the opposite side wall and inclined inwardly of the channel at an angle acute with respect to the inner face of the side wall to provide spaced depressions within the channel and securing means including a nut spanning said flanges within the channel, and a threaded rod extending through the nut for engagement with the inside of the channel back, said nut being arched to permit opposite edges to project into said depressions and to engage therein at points directly adjacent to the side walls.

2. A beam structure and securing means comprising a beam with a back and two side walls forming a channel, a flange on the edge of each side wall extending toward the opposite side wall and inclined inwardly of the channel at an angle acute with respect to the inner face of the side wall to provide spaced depressions within the channel and securing means including a nut spanning said flanges within the channel, and a threaded rod extending through the nut for engagement with the inside of the channel back, said nut being arched to permit opposite edges to project into said depressions and to engage therein at points directly adjacent to the side walls and having prongs projecting from said edges to deter slipping of the nut with respect to the channel.

References Cited in the file of this patent

UNITED STATES PATENTS

| Number | Name | Date |
|---|---|---|
| 1,064,699 | Berns et al. | Jan. 17, 1913 |
| 1,093,426 | Irwin | Apr. 14, 1914 |
| 2,345,650 | Atwood | Apr. 4, 1944 |

FOREIGN PATENTS

| Number | Country | Date |
|---|---|---|
| 102,988 | Austria | Apr. 10, 1926 |
| 455,572 | Germany | Feb. 1 1928 |